(12) United States Patent  (10) Patent No.: US 7,603,012 B1
Ice  (45) Date of Patent: Oct. 13, 2009

(54) OPTICAL CABLE WITH PEELABLE STRENGTH MEMBER PORTION

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/163,903

(22) Filed: Jun. 27, 2008

(51) Int. Cl.
*G02B 6/44* (2006.01)

(52) U.S. Cl. ........................ 385/103; 385/100

(58) Field of Classification Search .......... 385/100–114
See application file for complete search history.

(56) References Cited

U.S. PATENT DOCUMENTS

| | | | |
|---|---|---|---|
| 4,761,053 A * | 8/1988 | Cogelia et al. | 385/113 |
| 7,308,176 B2 * | 12/2007 | Bocanegra et al. | 385/103 |
| 7,391,943 B2 * | 6/2008 | Blazer et al. | 385/100 |
| 2006/0133746 A1 * | 6/2006 | Quinn et al. | 385/100 |

* cited by examiner

*Primary Examiner*—Sarah Song
(74) *Attorney, Agent, or Firm*—Workman Nydegger

(57) ABSTRACT

A fiber optic cable that includes one or more optical fibers, and one or more strength members spanning the length of the cable. The cable also includes a protective jacket protecting the cable across all, or at least substantially all of its length. One or more ends of the cable (and potentially as much as the entire length of the cable), includes a jacket portion that surrounds the strength member(s), and a jacket portion that surrounds the optical fiber(s). These jacket portions are connected by a peelable separation portion. Accordingly, when the optical fiber portion of the jacket is pulled relative to the strength member portion of the jacket, the separation portion ruptures permitting the strength member portion and the optical fiber portion to be peeled away from each other. This allows for independent control of the termination of the strength member(s) relative to the optical fiber(s).

20 Claims, 6 Drawing Sheets

OPTICAL CABLE WITH PEELABLE STRENGTH MEMBER PORTION

BACKGROUND

Communication technology has transformed our world. As the amount of information communicated over networks has increased, high speed transmission has become ever more critical. Fiber optic links enable high speed data transmission between nodes in a network. In a typical fiber-optic link, an optical transmitter at one node (i.e., a "first" node) in the network emits light representing information into a fiber-optic cable. That light is propagated through the optical fiber through principles of total internal reflection. The light is then received by an optical receiver at another node (i.e., a "second" node) in the network, whereby the data may be ideally reconstructed. This establishes one direction of a fiber-optic link since information can be communicated from the first node to the second node in a network using optics. The data might be consumed at the second network node, or may simply be relayed to yet another network node. Bidirectional optical links are also possible using transmitters and receives on both ends of the link.

Optical fibers are thus a key component of the optical communication. Fiber optic cables contain one or more optical fibers, but often also contain two further components; namely, strength member(s) (such as aramid yarn strands), and a jacket (also called a "sheath") that wraps around the bundle of optical fiber(s) and as strength member(s). The jacket serves as a mechanical barrier that protects its contents, particularly the optical fibers, from one or more environmental hazards such as, for example, abrasion, crushing, cutting, and so forth. The strength member(s) are secured to the connectors at both sides of the cable, and serve to endure the majority of the tensile stress that the cable might experience, rather than having the weaker optical fibers experience the tensile stress.

The optical cable is often attached to connectors at both ends. The process of attaching the optical cable to a connector is referred to in the art as "termination". In order to terminate a cable that includes a strength member, each optical fiber is optically coupled to an appropriate optical transmitter and/or optical receiver. Furthermore, the strength member(s) are mechanically affixed to the connector in a specific way depending on the connector design. This termination process may be performed prior to shipment of the cable. In that case, the cable is shipped with connectors already affixed at both ends. In some cases, termination might also be accomplished in the field, in which case, the cable might be cut to a desired length. Termination is a delicate process and should be done correctly in order to ensure proper optical operation of the cable, and to ensure that the strength members act to properly protect the cable from tensile forces.

BRIEF SUMMARY

Embodiments described herein relate to a fiber optic cable, and methods for using the same. The fiber optic cable includes one or more optical fibers, and one or more strength members spanning the length of the cable. The cable also includes a protective jacket protecting the cable across all, or at least substantially all of its length. One or more ends of the cable (and potentially as much as the entire length of the cable), includes a portion that surrounds the strength member(s), and a portion that surrounds the optical fiber(s). These portions are connected by a peelable separation portion. Accordingly, when the optical fiber portion of the jacket is pulled relative to the strength member portion of the jacket, the separation portion ruptures permitting the strength member portion and the optical fiber portion to be peeled away from each other.

When this is done at the end of the cable, the optical fiber(s) and the strength member may be terminated separately, allowing for independent control over the termination of the strength member(s) and optical fiber(s). This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments described herein relate to a fiber optic cable that includes one or more optical fibers, and one or more strength members spanning the length of the cable. The cable also includes a protective jacket protecting the cable across all, or at least substantially all of its length. One or more ends of the cable (and potentially as much as the entire length of the cable), includes a jacket portion that surrounds the strength member(s), and a jacket portion that surrounds the optical fiber(s). These jacket portions are connected by a peelable separation portion. Accordingly, when the optical fiber portion of the jacket is pulled relative to the strength member portion of the jacket, the separation portion ruptures permitting the strength member portion and the optical fiber portion to be peeled away from each other. This allows for independent control of the termination of the strength member(s) relative to the optical fiber(s).

Figure 1A:
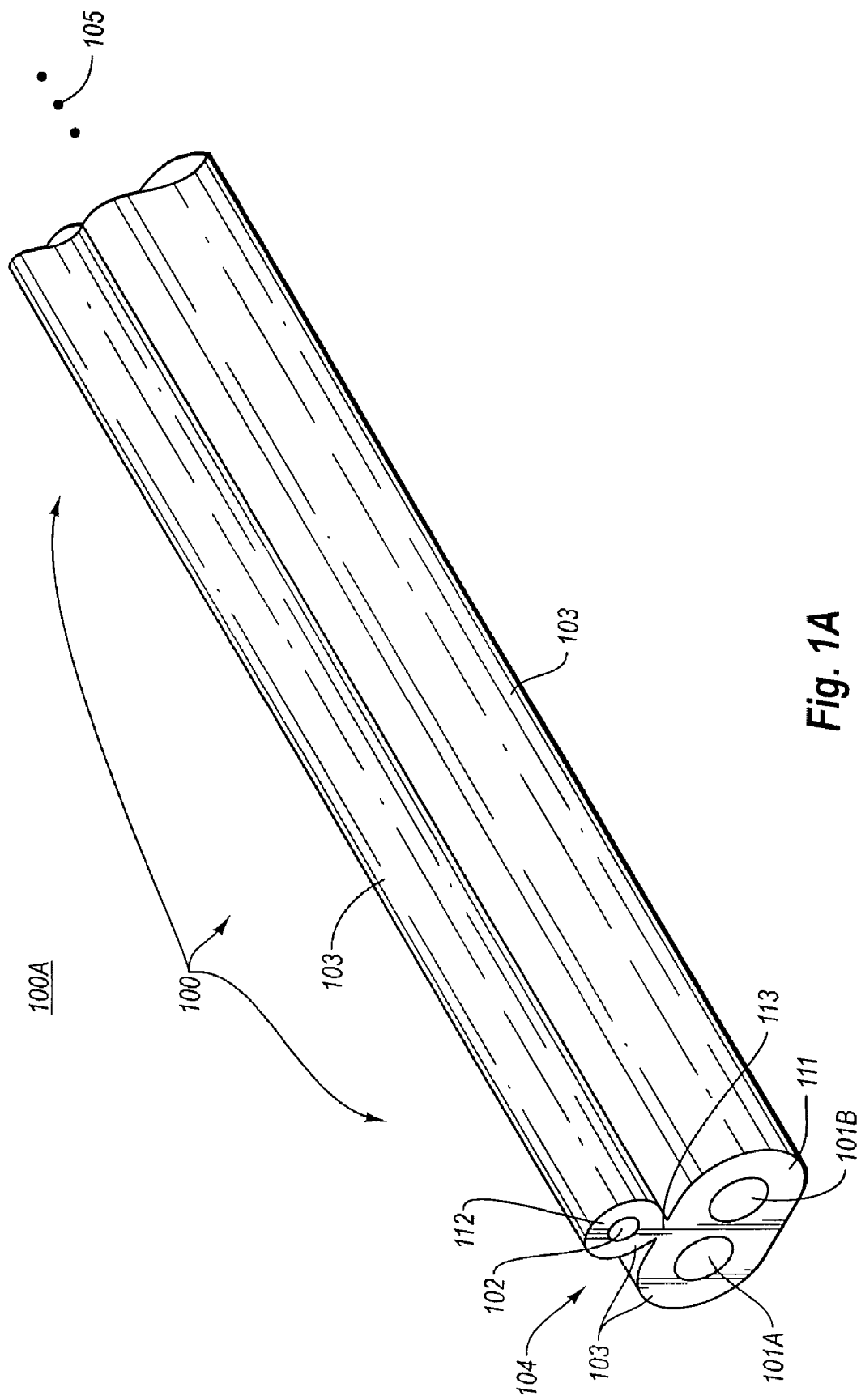
FIG. 1A illustrates a perspective view of a fiber optic cable that includes a strength member and two optical fibers, where the portion of the jacket that protects the strength members peels away from the portion of the jacket that protects the optical fibers.
Figure 1B:
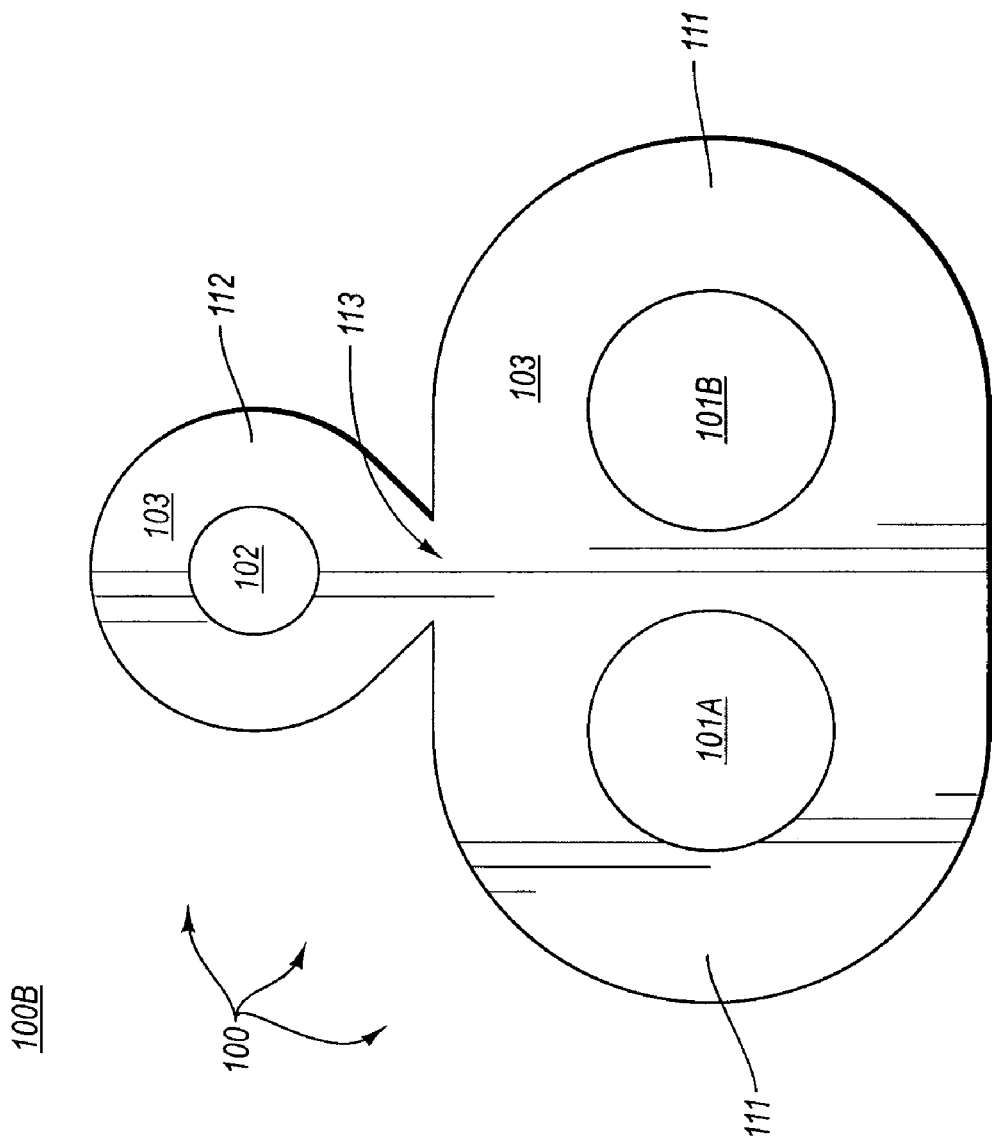
FIG. 1B illustrates a cross-section view of the fiber optic cable of FIG. 1A.

FIG. 1A illustrates a perspective view 100A of a fiber optic cable 100 in accordance with one embodiment described herein. FIG. 1B illustrates a cross-section view 100B of the fiber optic cable 100 of FIG. 1A.

The fiber optic cable 100 comprises one or more optical fibers. In the case of FIGS. 1A and 1B, the optical cable 100 includes two optical fibers 101A and 101B, which span the length of the cable 100. However, the principles of the invention are not limited to optical cables based on the number of optical fibers in the cable. An example cross section of a cable having only a single optical fiber will be described with respect to FIG. 4A. The principles described herein are applicable, however, to optical cables having three or more optical fibers as well. The optical fiber(s) may be glass or plastic, or any other material that propagates light by principles of total internal reflection.

The cable 100 also includes one or more strength members. In the case of FIGS. 1A and 1B, and as in the case for the alternative embodiments illustrated, only a single strength member is shown. However, the principles described herein also may apply to cables having multiple strength members. In FIGS. 1A and 1B, the cable 100 includes strength member 102, which spans the length of the cable 100.

The strength members are capable of withstanding tensile forces greater than each of the optical fibers. For instance, in FIGS. 1A and 1B, the strength member 102 may withstand greater tensile forces than either or both of the optical fibers 101A and 101B. In one embodiment, the strength member 102 may withstand greater tensile force than the optical fibers 101A and 101B could in the aggregate, and could perhaps even withstand greater tensile force than the combination of the optical fibers 101A and 101B as well as the protective jacket 103. The strength member 102 may even be viewed as a combination of strength elements, which act together to provide tensile strength to the cable 100.

The fiber optic cable 100 also includes a jacket 103 positioned around the one or more optical fibers and the one or more strength members. In particular, in FIGS. 1A and 1B, the jacket 103 is positioned around the optical fibers 101A and 101B and the strength member 102. Although this cross section may be maintained throughout the entire length of the cable, the cross section might also just be present at both ends of the cable, or perhaps just at one end of the cable 100. However, one advantage to having that same cross section at both ends is that it becomes easier for those terminating the cable to identify the polarity of each of the fibers. For instance, in the view of FIG. 1B looking into the cable, the left optical fiber might be for coupling to the transmitter, and the right optical fiber might be for coupling to the receiver. Since the cross-section is bilaterally symmetric, the same keying rules apply when viewing into the cable seeing the same cross section at the opposite side of the connector. Thus, termination of the cable may be done more quickly, and with reduced need to test the cable for correct polarity of optical transmission (i.e., that there are not two transmitters emitting light towards each other in the same optical fiber, and with no receiver coupled to the optical fiber).

The jacket 103 can be composed of any flexible material, that is preferably fire retardant. The jacket 103 may be formed of a plastic, such as for example, PolyVinyl Chloride (PVC). The jacket 103 may be rigidly coupled to the optical fibers 101A and 101B, or may allow some longitudinal movement in the direction of the cable length of the optical fibers with respect to the jacket.

As apparent especially from the cross sectional view of FIG. 1B, the jacket 103 includes an optical fiber portion 111 that surrounds the one or more optical fibers 101A and 101B, and a strength member portion 112 that surrounds the one or more strength members 102. The jacket 103 also includes a separation portion 113 between the strength member portion 111 and the optical fiber portion 112. The separation portion 113 is structured such that when force is applied pulling the optical fiber portion 111 from the strength member portion 112, the separation portion 113 ruptures first to thereby allow the strength member portion 112 and the optical fiber portion 111 of the jacket 103 to peel away from each other at the end of the fiber optic cable 100.

In one embodiment, to facilitate separation at the separation portion, the separation portion has a width that is smaller than (and perhaps less than half of) the width of the strength member portion. For instance, in FIG. 1B, the separate portion 113 has an approximate width of 310 microns, where the diameter of the strength member portion 112 is approximately 1000 microns.

Further, to facilitate separation, the optical fiber portion of the jacket and the strength member portion of the jacket meet each other at the separation portion at an acute angle that is less than 60 degrees. For example, in FIG. 1B, the optical fiber portion 111 and the strength member portion 112 meet at an acute angle of 45 degrees.

Of course, the principles of the present invention are by no means limited to the specify dimensions of the cross section of FIG. 1B. Although other example cross sections are given in FIGS. 4A and 4B, these cross sections are provided for example purposes only. There is an infinite variety of cable cross section designs that would be consistent with the principles of the present invention. Nevertheless, in the example, of FIG. 2, the central axis of the two optical fibers 101A and 101B are separated by approximately 1000 microns, with each optical fiber having a diameter of approximately 750 microns. The optical fiber portion is approximately 2700 microns wide, and 1700 microns high, with a 1700 diameter semicircular curvature on each end.

Figure 3:
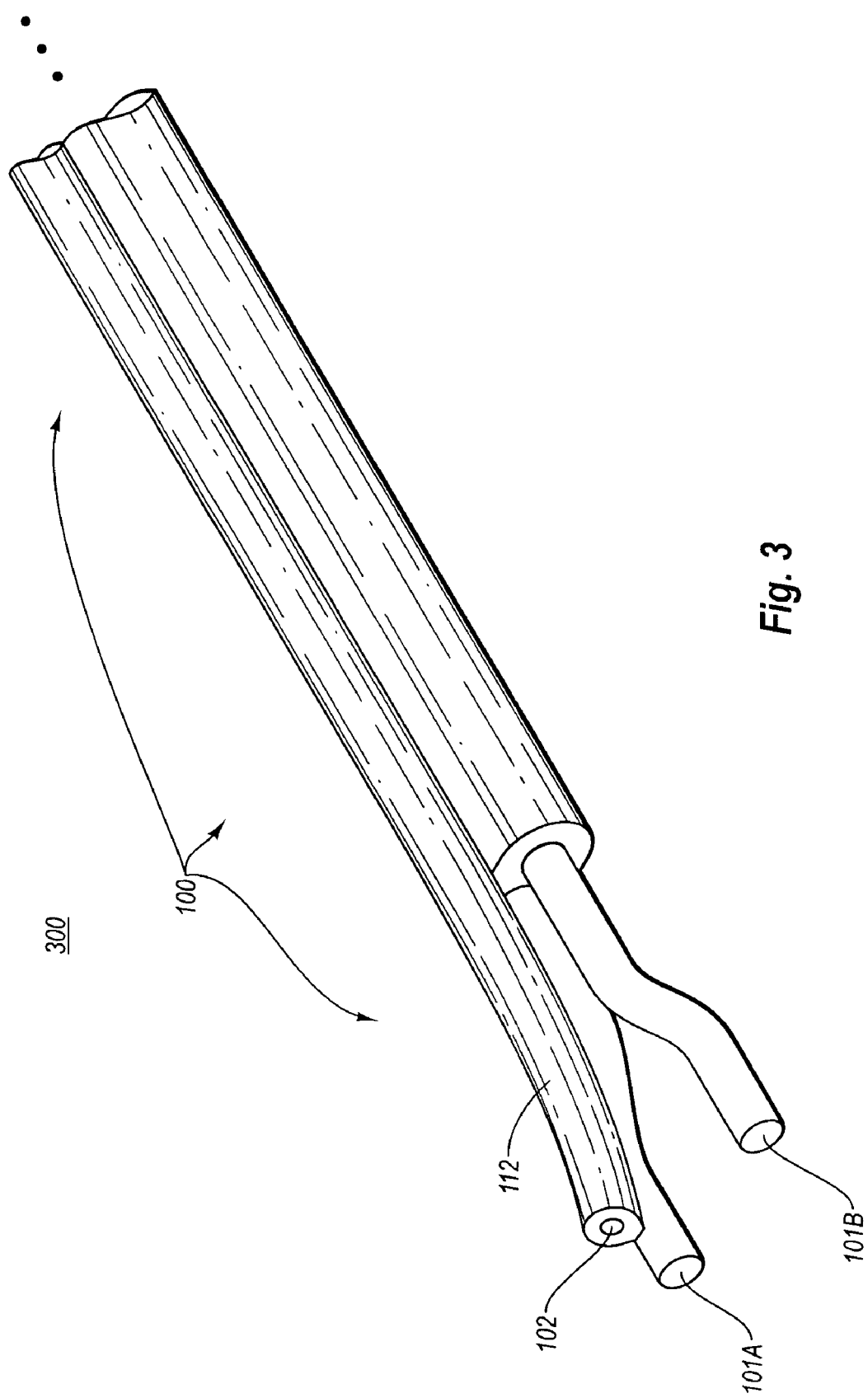
FIG. 3 illustrates a perspective view of the fiber optic cable of FIG. 2, except with the jacket stripped from the optical fibers, and with the optical fibers shown partially separate at the end in preparation for optical coupling.
Figure 4B:
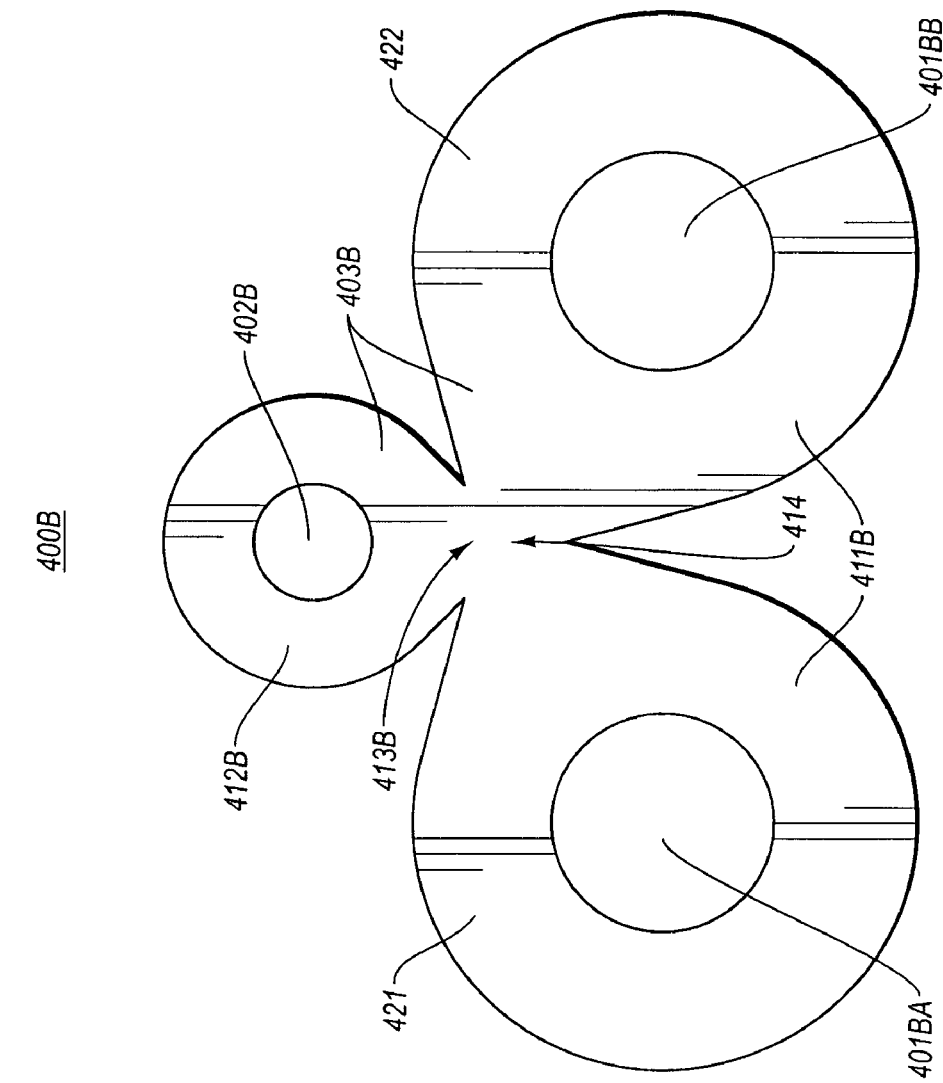
FIG. 4B illustrates a cross-section view of another alternative fiber optic cable, in which the optical fiber portions of the jacket are also peelable from each other to separate optical fibers.
Figure 4A:
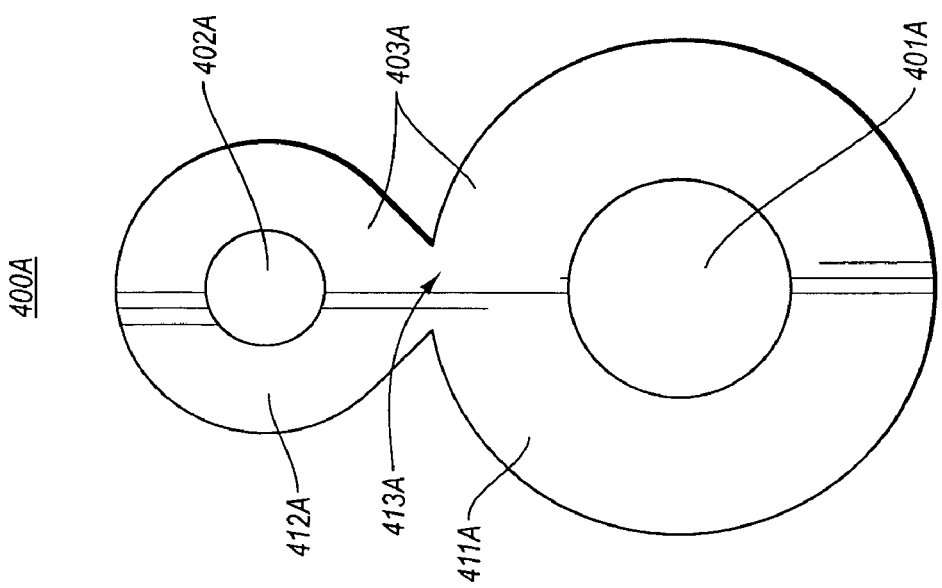
FIG. 4A illustrates a cross-section view of an alternative fiber optic cable, in which there is only one optical fiber contained in the optical fiber portion of the jacket.
Figure 5:
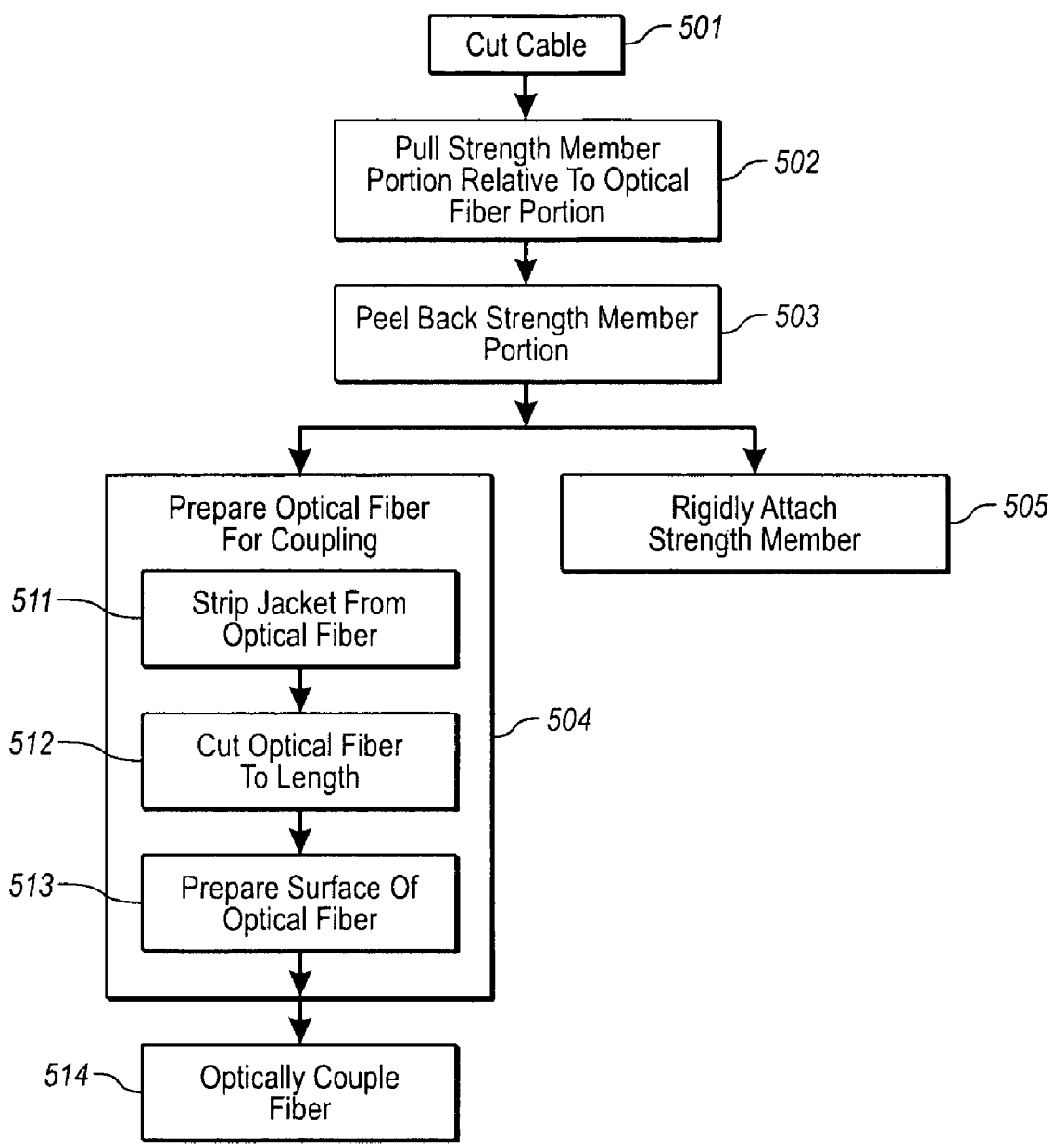
FIG. 5 illustrates a flowchart of a method for terminating a peelable cable.

FIG. 5 illustrates a flowchart of a method 500 for preparing an optical cable such as that illustrated with respect to FIGS. 1A through 4B for termination. Termination refers to the connecting of the fiber optic cable to an appropriate connector. The method first includes the optical act of cutting the cable (act 501). This cutting may be performed in the field, or at the time of manufacture of the cable. Furthermore, a cable that was cut at the time of manufacture, may be further cut to the appropriate length in the field. FIGS. 1A and 1B illustrate the cable as it might appear after being cut. The ellipses 105 represent that the cable may be extended for an indefinite length and that only one end 104 of the cable 100 is shown. The remote end of the cable may be similar to the shown proximate end 104 of the cable.

With these dimensions, when the strength member portion 112 of the jacket 103 is pulled relative to the optical fiber portion 111 (with the strength member portion 112 pulled upwards in FIG. 1B, and with the optical fiber portion 111 being pulled downwards in FIG. 1B), the strength member portion 112 peels away from the optical fiber portion 111. When this pulling occurs, the greatest concentration of stress occurs at the acute angles where the portions 111 and 112 meet at the separation portion 113. Thus causes the separation portion to rupture at the acute angle, with the rupturing tending to cross the span of the separation portion 113.

Figure 2:
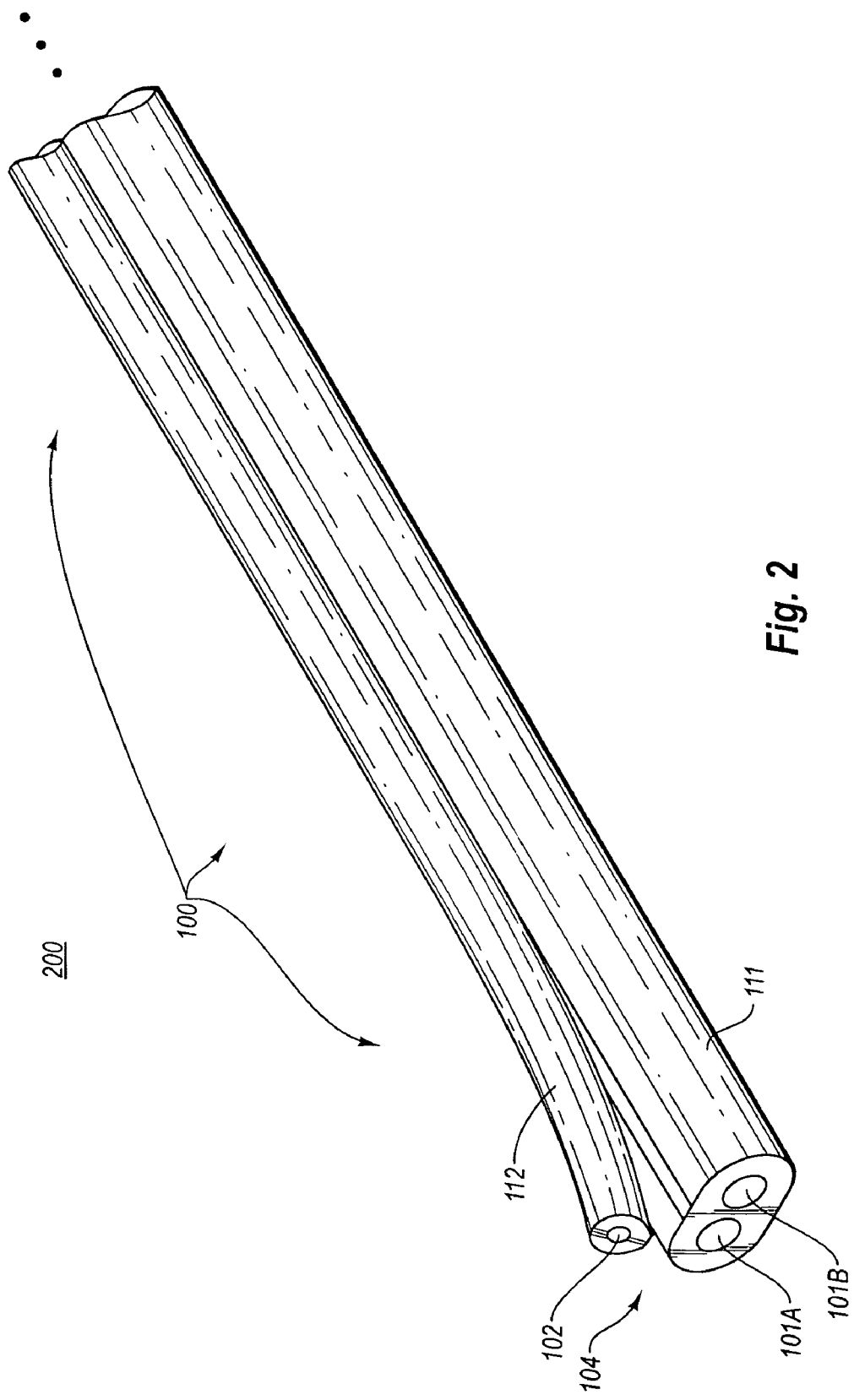
FIG. 2 illustrates a perspective view of the fiber optic cable of FIGS. 1A and 1B, but with the strength member portion of the jacket peeled partially away from the optical fiber portion of the jacket.

FIG. 2 illustrates a perspective view 200 of the cable 100 after the strength member portion 112 is pulled away from the optical fiber portion 111 at one end 104 of the cable 100. In other words, the strength member 112 is peeled partially away from the optical fiber portion 111 of the jacket 103. Referring back to FIG. 5, after the optional cutting operation (act 501), the optical fiber portion of the jacket is pulled with respect to the strength member portion of the jacket (act 502). The method 500 also includes rupturing the separation portion of the jacket as a result of the act of pulling, thereby peeling at least a portion of the strength member portion of the jacket away from the optical fiber portion of the jacket (act 503).

FIG. 2 illustrates how the fiber optic cable 100 may appear after this pulling and rupturing operation. Although the strength member portion 112 is separated from the optical fiber portion 111 at the cable end 104, these portions may remain connected at other portions of the cable. The same preparation may be made to the remote end of the cable. The strength member portion 112 may thus be peeled away for an appropriate length that allows independent termination of the strength member portion 112 and the optical fibers 101A and 101B. If the cross section of FIG. 1B is homogenous throughout the entire length of the cable, the strength member portion 111 may even be peeled away from the entire length of the cable 100, thereby forming a non-reinforced cable.

FIG. 3 illustrates a perspective view 300 of the fiber optic cable 100 of FIG. 2, except with the jacket stripped from the optical fibers, and with the optical fibers 101A and 101B shown partially separate at the cable end in preparation for optical coupling. Referring to FIG. 5, the method 500 includes preparing the optical fiber for optical coupling (act 504). This may include, for example, stripping the jacket away from the optical fiber (act 511), cutting the optical fiber to length (act 512) if not already at the proper length, and preparing the optical fiber surface (act 513) (e.g., by polishing for optimum optical coupling). FIG. 3 illustrates a possible appearance of the cable after this preparation, but just prior to optically coupling the optical fiber to the connector (act 514), and just prior to rigidly attaching the one or more strength members to the connector (act 505). Note that the optical fibers may be cut to a different length than the strength member to facilitate a wide variety of connector coupling mechanism. Furthermore, the preparation of the optical fibers for optical coupling may be done separately from the preparation of the strength members.

FIG. 4A illustrates a cross-sectional view 400A of another example embodiment of a fiber optic cable. In this cable, there is but a single optical fiber 401A and still a single strength member 402A. The jacket 403A once again includes an optical fiber portion 411A and a strength member portion 412A that may be peeled away from each other at the separation portion 413A.

FIG. 4B illustrates yet another cross-sectional view 400B of yet another example embodiment. In this embodiment, the cable 400B includes two optical fibers 401BA ad 401BB, and a strength member 402B. The jacket 403B includes an optical fiber portion 411B and a strength member portion 412B. Once again, the jacket includes a first separation portion 413B that may be used to peel the strength member portion 412B from the optical fiber portion 411B.

However, the optical fiber portion 411B also includes two subportions 421 and 422. One subportion surrounds one group of one or more fibers. In particular, subportion 421 surrounds optical fiber 401BA, and subportion 422 surrounds optical fiber 401BB. A second separation portion 414 is positioned between the two subportions 421 and 422, such that the two subportions 421 and 422 may also be peeled away from each other at least at the end of the cable.

Accordingly, the principles described herein permit a cable to be quickly prepared for termination by first physically separating the strength member and optical fibers in a convenient fashion. The strength member and optical fiber members may then be independently prepared for coupling with a connector.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fiber optic cable comprising:
a plurality of optical fibers spanning the length of the fiber optic cable;
one or more strength members spanning the length of the fiber optic cable, wherein the one or more strength members are capable of withstanding tensile forces greater than each of the plurality of optical fibers; and
a jacket positioned around the plurality of optical fibers and the one or more strength members spanning substantially all of the length of the fiber optic cable,
wherein at least at one end of the fiber optic cable, the jacket includes:
a strength member portion that surrounds the one or more strength members;
an optical fiber portion that surrounds the plurality of optical fibers; and
a separation portion between the strength member portion and the optical fiber portion, the separation portion being structured such that when force is applied pulling the optical fiber portion from the strength member portion, the separation portion ruptures first to thereby allow the strength member portion and the optical fiber portion of the jacket to peel away from each other at the end of the fiber optic cable, and
wherein the fiber optic cable has a bilaterally symmetric cross-section defined by a line of symmetry that divides the plurality of optical fibers into a first group of one or more optical fibers and a second group of one or more optical fibers.

2. The fiber optic cable in accordance with claim 1, wherein the plurality of optical fibers comprise a single optical fiber in the first group and a single optical fiber in the second group.

3. The fiber optic cable in accordance with claim 2, wherein the single optical fiber in the first group has a first central axis and the single optical fiber in the second group has a second central axis, the first and second axes being separated by a distance substantially equal to a width of the strength member portion of the jacket.

4. The fiber optic cable in accordance with claim 3, wherein the one or more strength members comprise a single strength member.

5. The fiber optic cable in accordance with claim 2, wherein the one or more strength members comprise a single strength member.

6. The fiber optic cable in accordance with claim 1, wherein the one or more strength members comprise a single strength member.

7. The fiber optic cable in accordance with claim 1, wherein the separation portion of the jacket has a width that is smaller than a width of the strength member portion of the jacket.

8. The fiber optic cable in accordance with claim 1, wherein the separation portion of the jacket has a width that is less than half of the width of the strength member portion of the jacket.

9. The fiber optic cable in accordance with claim 1, wherein the strength member portion of the jacket, and the optical fiber portion of the jacket meet each other at the separation portion at an acute angle that is less than 60 degrees.

10. The fiber optic cable in accordance with claim 1, wherein the one or more strength members are composed of aramid yarn.

11. The fiber optic cable in accordance with claim 1, wherein the jacket is composed of plastic.

12. The fiber optic cable in accordance with claim 1, wherein the jacket is composed primarily of PolyVinyl Chloride (PVC).

13. The fiber optic cable in accordance with claim 1, wherein the separation portion of the jacket is a first separation portion of the jacket and wherein the optical fiber portion of the jacket comprises the following at least at the end of the fiber optic cable:
- a first optical fiber subportion surrounding the first group of one or more optical fibers;
- a second optical fiber subportion surrounding the second group of one or more optical fibers; and
- a second separation portion between a first optical fiber subportion and the second optical fiber subportion, the second separation portion being structured such that when force is applied pulling the first optical fiber subportion from the second optical fiber subportion, the second separation portion ruptures first to thereby allow the first and second optical fiber subportions to peel away from each other at least at the end of the fiber optic cable.

14. A fiber optic cable comprising:
- a plurality of optical fibers spanning the length of the fiber optic cable;
- one or more strength members spanning the length of the fiber optic cable, wherein the one or more strength members are stronger in the aggregate than the plurality of optical fibers in the aggregate; and
- a jacket positioned around the plurality of optical fibers and the one or more strength members spanning substantially all of the length of the fiber optic cable,
- wherein at least at one end of the fiber optic cable, the jacket includes:
  - a strength member portion that surrounds the one or more strength members;
  - an optical fiber portion that surrounds the plurality of optical fibers; and
  - a separation portion between the strength member portion and the optical fiber portion, the separation portion being structured such that when force is applied pulling the optical fiber portion from the strength member portion, the separation portion ruptures first to thereby allow the strength member portion and the optical fiber portion of the jacket to peel away from each other at the end of the fiber optic cable, and
- wherein the fiber optic cable has a bilaterally symmetric cross-section defined by a line of symmetry that divides the plurality of optical fibers into a first group of one or more optical fibers and a second group of one or more optical fibers.

15. The fiber optic cable of claim 14, wherein the strength member portion and the optical fiber portion are already peeled apart from each other at an end of the fiber optic cable, leaving the strength member portion and the optical fiber portion connected at the separation portion further from the end of the fiber optic cable.

16. The fiber optic cable of claim 14, wherein at least one of the one or more optical fibers is composed of glass.

17. The fiber optic cable of claim 14, wherein at least one of the one or more optical fibers is composed of plastic.

18. The fiber optical cable of claim 14, wherein at least a portion of the optical fiber portion of the jacket is stripped away from the plurality of optical fibers.

19. A method for preparing an fiber optic cable for termination, the fiber optic cable comprising a plurality of optical fibers spanning the length of the fiber optic cable, one or more strength members spanning the length of the fiber optic cable, and a jacket positioned around the plurality of optical fibers and the one or more strength members, the method comprising:
- an act of pulling at least one of an optical fiber portion of the jacket that surrounds the plurality of optical fibers and a strength member portion of the jacket that surrounds the one or more strength members;
- an act of rupturing a first separation portion of the jacket as a result of the act of pulling the at least one of optical fiber and strength member portions of the jacket, thereby peeling at least a portion of the strength member portion of the jacket away from the optical fiber portion of the jacket;
- an act of pulling at least one of a first and a second optical fiber subportion of the optical fiber portion of the jacket, the first and second subportions surrounding first and second respective groups of one or more optical fibers; and
- an act of rupturing a second separation portion of the jacket as a result of the act of pulling the at least one of first and second optical fiber subportions of the optical fiber portion, thereby peeling at least a portion of the first optical fiber subportion away from at least a portion of the second optical fiber subportion.

20. The method of claim 19, further comprising:
- an act of cutting the cable prior to the act of pulling the at least one of optical fiber and strength member portions of the jacket.

* * * * *